Figures 1, 2:
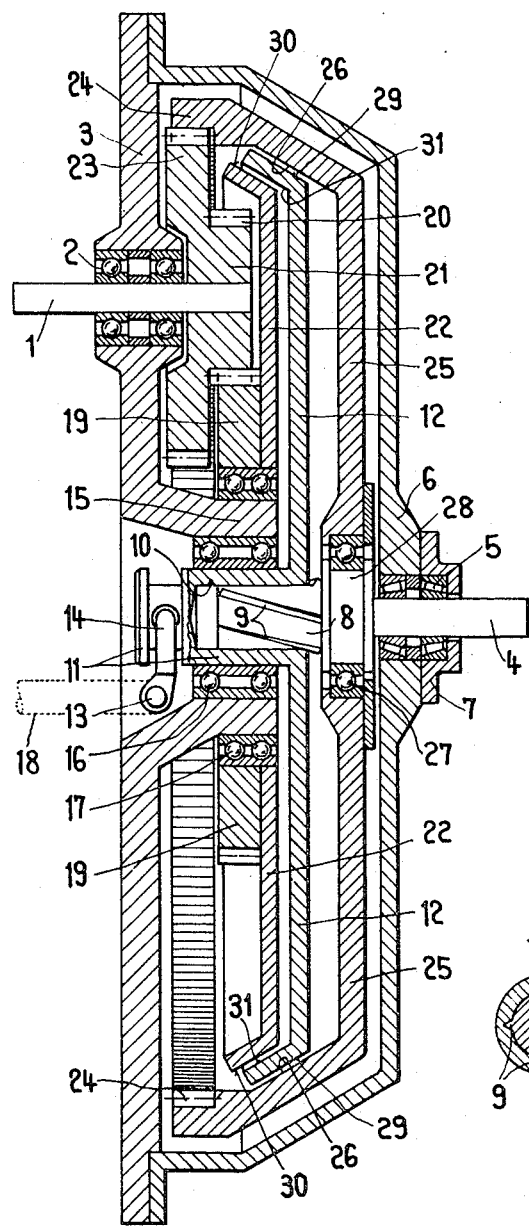

Feb. 14, 1967    C. NORMANN    3,303,712
TOOTHED-WHEEL GEARING
Filed June 15, 1964

INVENTOR
Cato Normann
BY Imirie v Smiley
ATTORNEYS

United States Patent Office 3,303,712
Patented Feb. 14, 1967

3,303,712
TOOTHED-WHEEL GEARING
Cato Normann, Fiskerkroken 8, Oslo, Norway
Filed June 15, 1964, Ser. No. 375,007
Claims priority, application Germany, June 26, 1963,
23,371
4 Claims. (Cl. 74—377)

This invention concerns a toothed-wheel gearing.

Change-over gearings, such as change-speed gearings and reversing gearings of prior construction have, in most cases, sliding wheels and require much space. Moreover, in these known gearings, the engaging and disengaging of toothed-wheels causes heavy wear.

The present invention relates to a toothed-wheel gearing, such as a change-speed and/or reversing gearing in which a friction change-over disk is substituted for sliding wheels. The gearing according to the invention is distinguished by an internally toothed-wheel on the inside of which the other wheels and the friction disk are arranged. The disposition results in a considerably smaller space required than with gearings comprising sliding wheels and, moreover, the toothed-wheels can permanently remain in engaged condition.

Furthermore, the invention concerns a toothed-wheel gearing with a friction change-over disk whose hub is connected by a servo-arrangement with the shaft on which the friction disk is mounted with allowance for axial adjustment. Due to this servo-arrangement a relatively small adjusting power produces a high contact pressure of the change-over disk against the friction surface cooperating with the disk; this fact being of special advantage for the transmission of heavy power as, for instance, in ship drives.

The accompanying drawing illustrates, by way of example an embodiment designed as a change-over gearing for driving ship propellers.

FIG. 1 is an axial sectional view thereof and

FIG. 2 a cross section through the driven shaft.

The engine shaft 1 runs on ball bearings 2 provided in the casing wall 3. The one end of the driven shaft 4, in the present case of the propeller shaft, is mounted by means of roller bearings 5 provided in the casing cover 6 and in a cap 7 screwed to the cover 6. A thickened portion 8 of the propeller shaft 4 has a coarse thread 9 engaging corresponding grooves 10 on the inner wall of the hub 11 of the friction change-over disk 12. A forked adjusting lever 14 engaging the hub 11 is swingingly mounted in the casing wall 3 as at 13 and can be operated in any suitable manner, such as, for instance, by a member 18. The adjusting lever 14 serves the purpose of axially adjusting the hub 11 relatively to the shaft 4. Due to the thread 9 engaging the grooves 10 the hub 11, on being axially adjusted, also slightly rotates relatively to the shaft 4. The means 13 and 14 and the thickened shaft portion 8 lie entirely inside the outer face of the wall 3.

The inner racering of a ball-bearing 16 is loosely rotable on the hub 11 and the outer racering of the ball-bearing 16 engages the inner wall of a collar 15 of the wall 3. Therefore, the ball-bearing 16 serves the mounting of the hub 11 and, thereby of the propeller shaft 4. A toothed-wheel or gear 19 is rotatably mounted on the collar 15 by means of a ball-bearing 17 and is permanently in mesh with the smaller pinion 20 of a stepped gear-set 21 fixed to the engine shaft 1. A second friction disk 22 having a friction surface 30 is rigidly fixed to the toothed-wheel 19. The larger pinion 23 of the stepped gear-set 21 is in permanent mesh with the internal toothed rim 24 of a bell-shaped or dished wheel 25 comprising a friction surface 26 and being loosely rotatable on a collar 28 of the propeller shaft 4 by means of a ball-bearing 27.

The change-over friction disk 12 disposed between the friction surface 26 and the friction disk 22, and the wheels 21 and 19 lie within the internally toothed-wheel 25. Due to this disposition the width of the gearing is for the same output only about a quarter of the width of prior gearings especially of those for ship propeller drives.

In the position of the various parts as illustrated in FIG. 1 the gearing is disengaged. If the propeller shaft 4 is to be given a forward speed, the forked lever 14 is swung about 13 in the clockwise direction (FIG. 1). Thereby the hub 11 is adjusted along the thickened shaft portion 8 towards the right (FIG. 1) and, due to the cooperating threads 9 and 10, is also slightly rotated relatively to the shaft portion 8. The conical friction surface 29 of the change-over friction disk 12, while slightly rotating, comes to bear against the friction surface 26 of the wheel 25 until it adheres firmly to the latter. The slight rotation of the disk 12 obtained by the coarse threads 9 and 10 between the shaft portion 8 and the hub 11 of the disk causes a particularly firm seat of the friction surface 29 on the friction surface 26 of the wheel 25. Therefore, the shaft 4 and the change-over friction disk 12 are connected with each other by a servo-arrangement 8, 9, 10 and 11, due to which a relatively small adjusting power on the forked lever 14 produces a very high contact pressure between the friction surfaces 29 and 26. The engine shaft 1 rotating, for instance, at a speed of 3000 rev./min. transmits its motion (in the present case at a speed reduction ratio of 3:1) by the intermediary of the pinion 23, the wheel 25 and the servo-arrangement 8, 9 and 10 to the propeller shaft 4 rotating at 1000 rev./min. With this adjusting position the disk 12, due to the servo-threads 9 and 10, has permanently the tendency to move along the shaft 4 towards the right so that a suitable contact pressure between the friction surfaces 29 and 26 is permanently guaranteed. If the propeller shaft 4 is to be given reverse motion, the ship engine is throttled. On throttling the engine, i.e., on reducing the speed of the wheel 25, the disk 12, because of the inertia of the shaft 4, is disengaged from the wheel 25 due to the servo-arrangement 9, 10. After throttling, the forked lever 14 is swung about 13 in the anticlockwise direction (FIG. 1). Thereby, the change-over friction disk 12 comes at first into the idle position as shown in FIG. 1 and afterwards into engagement with the conical friction surface 30 of the friction disk 22, while the servo-arrangement 8, 9, 10, 11 again provides for a powerful contact pressure between the friction surfaces 30 and 31. The shaft 4 is now driven in the reverse direction at a speed reduction ratio of 3:1 from the smaller pinion 20 of the stepped gear-set 21 through the intermediary of the wheel 19, the friction disks 22 and 12 and the servo-arrangement increasing the contact pressure between the surfaces 30 and 31.

As an adjusting device a toothed rack with a toothed-wheel could be substituted for the forked lever 14. The friction surfaces 30, 31, 29 and 26, instead of being conical, might be plane. The gear ratio may be any other than 3:1. Also the arrangement of the wheels may be different from that shown in the drawing; further intermediate gear wheels may, for instance, be added. The toothed-wheel gearing according to the invention may also be used for other purposes than ship drives.

I claim:

1. A reversing gear assembly comprising, in combination, a casing having a wall and a cover, said wall having a collar projecting toward said cover, a drive shaft journalled in said wall in offset relation to said collar and extending into said casing, a gear-set fixed to said drive shaft within said casing and comprising a pair of pinions of different diameter, a gear journalled on said collar and meshing with the smaller of said pinions, a driven shaft journalled in said cover in axial alignment with said collar, a friction disk having a hub journalled within said collar and fixed for rotation with said driven shaft but axially slidable thereon, a dished wheel journalled on said driven shaft and having internal teeth meshing with the larger of said pinions, a second friction disk fixed to the gear journalled on said collar and lying on that side of the first friction disk opposite that facing the dished wheel, and means for shifting the first friction disk axially into engagement alternatively with said dished wheel and said second friction disk.

2. A reversing gear assembly according to claim 1 wherein said hub of said first friction disk is connected to said driven shaft by means of coarse helical threads whereby relative rotational movement is imparted to said first friction disk in response to axial movement thereof, the helix direction of such threads being such as to self-energize the frictional engagement of said first friction disk with both said dished wheel and said second friction disk.

3. A reversing gear assembly according to claim 2 wherein said first and second friction disks and said dished wheel are provided with frusto-conical interengaging surfaces.

4. The reversing gear assembly according to claim 1 wherein said first and second friction disks and said dished wheel are provided with frusto-conical interengaging surfaces.

References Cited by the Examiner
UNITED STATES PATENTS

| | | | |
|---|---|---|---|
| 1,560,982 | 11/1925 | Fornaca | 74—377 |
| 2,804,779 | 9/1957 | Bergstedt | 74—377 |
| 3,212,349 | 10/1965 | Bergstedt | 74—377 |

DAVID J. WILLIAMOWSKY, *Primary Examiner.*

H. S. LAYTON, *Assistant Examiner.*